United States Patent
Stapleton et al.

(12)

(10) Patent No.: US 11,930,105 B1
(45) Date of Patent: Mar. 12, 2024

(54) EXTENSIBLE QUANTUM RANDOM NUMBER GENERATION

(71) Applicant: Wells Fargo Bank, N.A., San Francisco, CA (US)

(72) Inventors: Jeff J. Stapleton, O'Fallon, MO (US); Peter Bordow, Fountain Hill, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 167 days.

(21) Appl. No.: 17/451,791

(22) Filed: Oct. 21, 2021

(51) Int. Cl.
*H04L 9/40* (2022.01)
*H04L 9/08* (2006.01)

(52) U.S. Cl.
CPC .......... *H04L 9/0852* (2013.01); *H04L 9/0877* (2013.01); *H04L 63/0435* (2013.01); *H04L 63/0869* (2013.01)

(58) Field of Classification Search
CPC . H04L 9/0852; H04L 9/0877; H04L 63/0435; H04L 63/0869
See application file for complete search history.

(56) References Cited

U.S. PATENT DOCUMENTS

| | | | |
|---|---|---|---|
| 9,092,283 B2 | 7/2015 | Tkacik et al. | |
| 10,158,991 B2 | 12/2018 | Link, II | |
| 10,855,453 B1 | 12/2020 | Vakili | |
| 2009/0060185 A1 | 3/2009 | Tresser | |
| 2017/0237564 A1* | 8/2017 | Watanabe | H04L 9/0643 713/168 |
| 2018/0068305 A1* | 3/2018 | Baik | G06Q 20/327 |
| 2018/0241739 A1* | 8/2018 | Takazoe | G06F 21/44 |
| 2019/0190723 A1* | 6/2019 | Lee | H04L 9/3247 |
| 2020/0008057 A1* | 1/2020 | Zhao | H04L 9/0869 |
| 2020/0403787 A1* | 12/2020 | Islam | H04L 9/0852 |
| 2021/0051002 A1* | 2/2021 | Cheng | H04L 9/088 |
| 2023/0138804 A1* | 5/2023 | Mao | G06F 3/1454 348/14.03 |

* cited by examiner

*Primary Examiner* — Thaddeus J Plecha
(74) *Attorney, Agent, or Firm* — K&L Gates LLP

(57) ABSTRACT

Systems, apparatuses, methods, and computer program products are disclosed for securing communications between devices. An example method includes obtaining a quantum random number (QRN) from a remote QRN source using a secure communication channel between the initiating device and the remote QRN source. The QRN may be a true random number. The example method may also include using the QRN to participate in computer implemented services with the participating device that received the QRN from the remote QRN source.

19 Claims, 12 Drawing Sheets

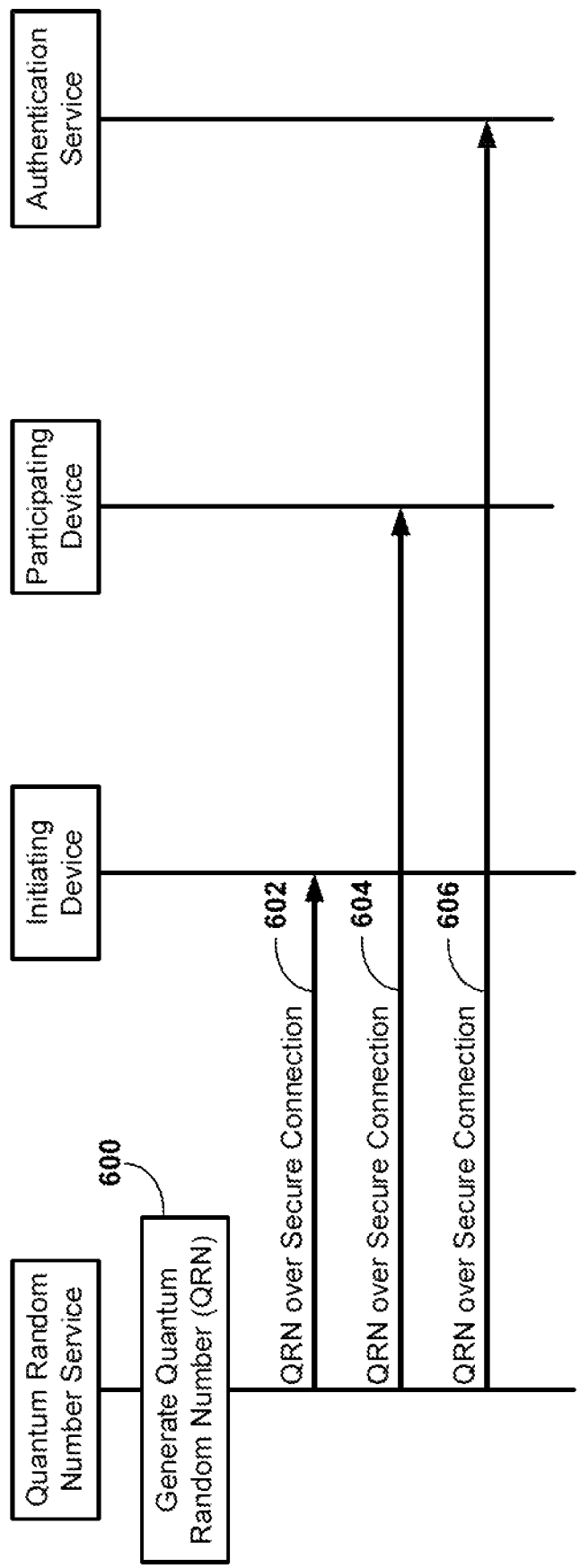

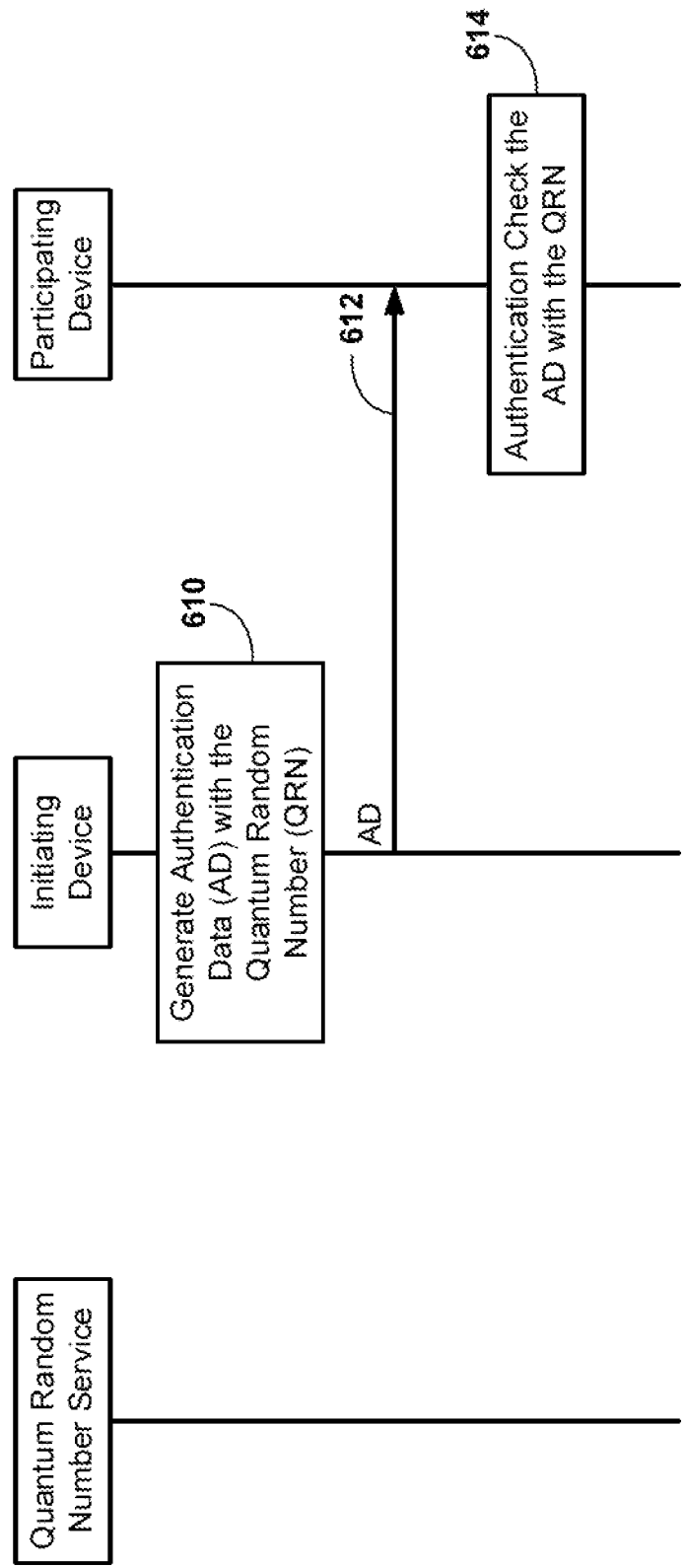

EXTENSIBLE QUANTUM RANDOM NUMBER GENERATION

BACKGROUND

Modern systems may facilitate communication between parties at various physical locations out of eyesight of one another. Such systems may be highly distributed with various components being located substantial distances from one another. The distances between these components and flaws in the operation of the components may allow for third parties to gain access to communications between parties using these systems.

BRIEF SUMMARY

Communication systems facilitate a broad array of interactions between computer systems and users thereof. As part of these interactions, the computer systems may send and receive sensitive data. Due to the value of the sensitive data, third parties may attempt to access to the sensitive data.

To reduce the likelihood of third parties gaining access to the sensitive data, various security operations may be performed such as authentication of parties to communications, encrypting of data communicated between devices, etc. However, these security operations may presume that truly random numbers are available. Use of random numbers in these security operations that do not correspond to a truly random distribution may be leveraged by third parties to compromise the security operations thereby gaining access to sensitive data.

Systems, apparatuses, methods, and computer program products are disclosed herein for communication security in a distributed system. The communication security may be provided through a combination of authentication, encryption, and/or other actions (e.g., "protective actions") performed using truly random numbers. To provide for the use of truly random numbers in these protective action, a system may include a quantum random number source (e.g., which may be implemented with a service). The quantum random number sources my include hardware for generating truly random numbers using quantum processes and securely distribute the truly random numbers to other components for subsequently performed protective actions. When distributing the truly random numbers, the quantum random number source may secure its communications with other components via classical methods (e.g., one time use passwords, pre-shared keys, etc.). By distributing the truly random numbers, a number of components of a distributed system that do not include truly random number generation functionality may be afforded the benefits of having access to truly random numbers.

In one example embodiment, a method is provided for authentication between an initiating device and a participating device operably connected to each other with a transmission medium used to transmit data between the initiating device and the participating device. The method includes generating, by generation hardware of the initiating device, a pair of entangled photons, the pair of entangled photons having a polarization relationship, and a polarization of each entangled photon of the pair of entangled photons being unknown when generated. The method further includes transmitting, by communication hardware of the initiating device and via the transmission medium, a first entangled photon of the pair of entangled photons to the participating device. The method also includes obtaining, by measurement hardware of the initiating device, a bit of a bit sequence based on a polarization of a second entangled photon of the pair of entangled photons, the polarization relationship fixing the polarizations of the pair of entangled photons upon a first polarization measurement of either entangled photon of the pair of entangled photons. The method further includes obtaining, by the communication hardware, authentication data from the participating device, the authentication data being based, at least in part, on the polarization of the first of the pair of entangled photons. The method also includes determining, by authentication circuitry of the initiating device, an authentication status of the participating device with the authentication data and the bit sequence, the authentication status indicating whether the participating device has an identity presumed by the initiating device.

In one example embodiment, a method for securing communications between an initiating device and a participating device using quantum random numbers is provided. The method may include obtaining, by quantum random number (QRN) management circuitry of the initiating device, a quantum random number (QRN) from a remote QRN source using a secure communication channel between the initiating device and the remote QRN source, the QRN being a true random number; and using, by security circuitry of the initiating device, the QRN to participate in computer implemented services with the participating device that received the QRN from the remote QRN source.

The method may also include, prior to obtaining the QRN, establishing the secure communication channel between the initiating device and the remote QRN source.

Using the QRN to participate in the computer implemented services may include generating, by the security circuitry with a portion of the QRN, authentication data; performing, by the security circuitry with the authentication data, an authentication operation with the participating device to obtain an authentication state for the computer implemented services; determining, by the security circuitry, whether the authentication state is acceptable or unacceptable; in an instance in which the authentication state is determined to be unacceptable, performing an action set to remediate unintended party interference risk associated with the computer implemented services; and, in an instance in which the authentication state is acceptable, performing the computer implemented services without performing any action sets to remediate the unintended party interference risk.

In another example embodiment, an initiating device is provided. The initiating device may include quantum random number management circuitry to obtain a quantum random number from a remote QRN source using a secure communication channel between the initiating device and the remote QRN source, the QRN being a true random number; and security circuitry to use the QRN to participate in computer implemented services with a participating device that received the QRN from the remote QRN source.

The initiating device may also include communications hardware to, prior to obtaining the QRN, establish the secure communication channel between the initiating device and the remote QRN source.

In a further example embodiment, a quantum random number service device is provided. The quantum random number service may include quantum random number generation hardware to generate true random numbers with a quantum process; QRN management circuitry to distribute information based on the true random number to both an initiating device and a participating device, the information being adapted to secure communications between the initiating device and the participating device; and communications hardware to secure distribution of the information to the initiating device and the participating device.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIGS. 6A-6D illustrate example operations of a system, in accordance with some example embodiments described herein.

DETAILED DESCRIPTION

Figure 1:
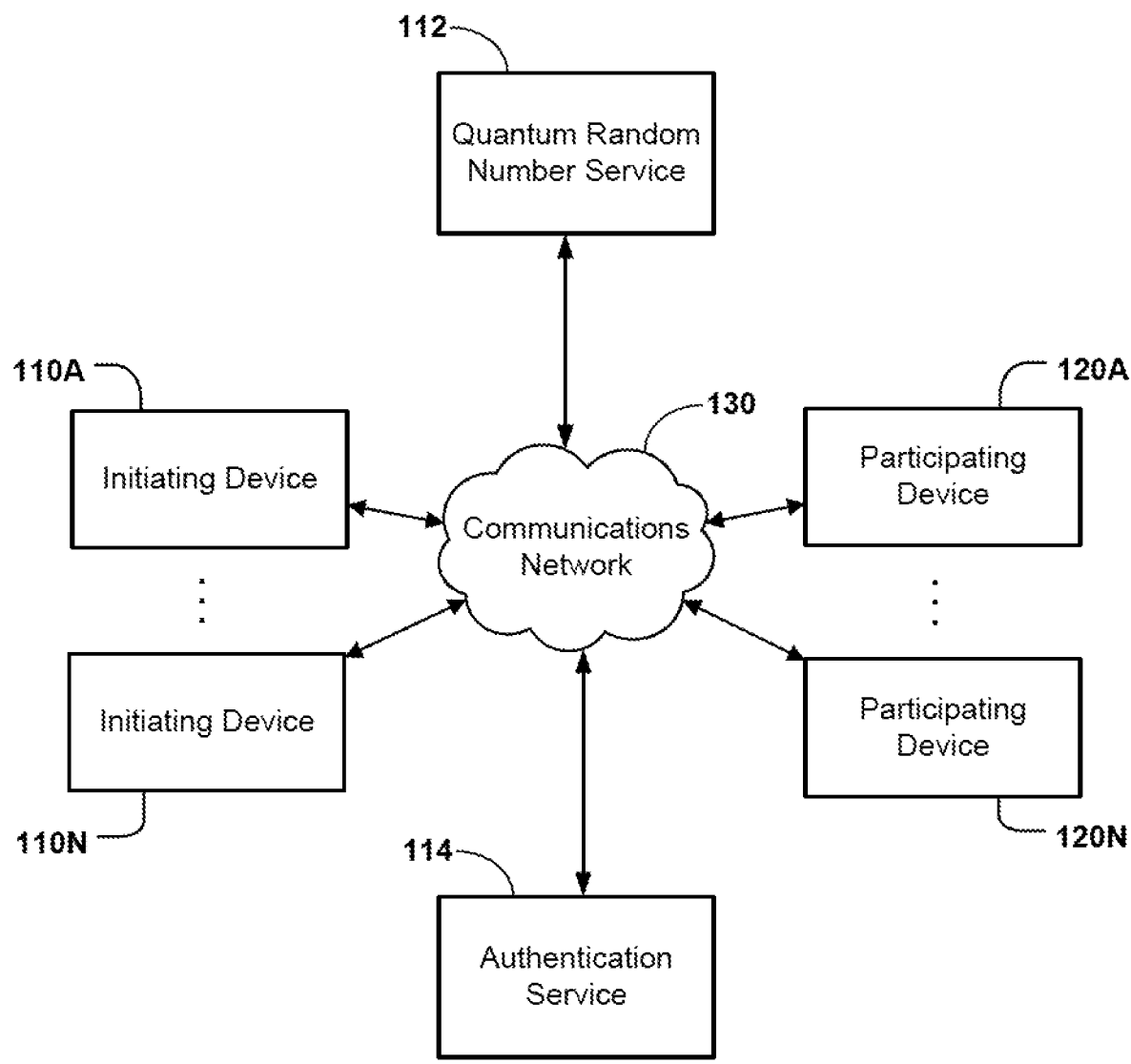
FIG. 1 illustrates a system in which some example embodiments may be used for authenticating devices and/or users thereof.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, example embodiments described herein provide methods, apparatuses, systems, and computer program products are described herein that provide for securing communications between components of a distributed system. The distributed system may allow the devices and users to provide and obtain various services including, for example, data distribution, voice transmission, and/or other types of computer implemented services. As part of these services, sensitive data may be distributed within the distributed system.

Traditionally, it has been difficult to secure communications between devices in distributed systems which rely on random numbers to secure the communications. Many methods and hardware devices for generating random numbers do not generate truly random numbers. Rather, these methods and hardware devices commonly employed for number generation may in fact generate numbers that are not random. Parties may leverage the lack of randomness in the numbers used by components of a distributed system for communication security to compromise the security of the communications.

Example embodiments may provide for the improvement of communication security in a distributed system. In contrast to conventional techniques that may rely on numbers that are not truly random for security, the disclosed example embodiments may distribute quantum random number (e.g., numbers generated based on quantum processes) to devices for security purposes. The devices to which the quantum random numbers are distributed may use the quantum random numbers to, for example, authenticate other device, secure communication channels, and/or perform other actions that may reduce the likelihood of unintended recipients obtaining sensitive information transmitted between devices.

Thus, an example system and device in accordance with embodiments disclosed herein may include a source of quantum random numbers which are used by multiple devices for communication security. Consequently, each component of a distributed system may not need to have access to quantum random numbers (or other types of numbers that correspond to a truly random number distribution) while still being afforded the benefit of truly random numbers for security purposes.

Although a high level explanation of the operations of example embodiments has been provided above, specific details regarding the configuration of such example embodiments are provided below.

System Architecture

Example embodiments described herein may be implemented using any number and type of computing devices. To this end, FIG. 1 illustrates an example environment within which various embodiments may operate. As illustrated, the environment may include any number of initiating devices 110A-110N and participating devices 120A-120N. These devices may interact with one another to perform any number and types of services. When performing the services, the devices may authenticate one another. As used herein, the term initiating device refers to a device initiates authentication of another device (e.g., a participating device). Likewise, the term participating devices refers to a device that is participating in authentication initiated by another device. Any device may be an initiating device and/or a participating device (for example, a device may both be in the process of authenticating another device while also being authenticated by a different device) depending on their role, which may change over time.

Returning to the discussion of the services provided by these device, these devices may identify all, or a portion, of the devices participating in the services, authenticate one or more devices participating in the services, secure communications between these devices, and/or perform other actions to reduce the likelihood of unintended actors participating in and/or receiving the services. As part of performing the services, any of the devices may transmit sensitive data to one another. By identifying, authenticating, securing communications, and/or performing other actions, these devices may reduce the likelihood of sensitive data being distributed to unintended recipients.

The initiating devices 110A-110N may be implemented using any number (one, many, etc.) and types of computing devices known in the art, such as desktop or laptop computers, tablet devices, smartphones, or the like. The initiating devices may be associated with corresponding users (e.g., administrators, customers, representatives, other persons, etc.) that use the initiating devices 110A-110N to interact with one or more of the participating devices 120A-120N.

The users and/or applications hosted by the initiating devices may transmit sensitive data to and/or receive sensitive data from the participating devices 120A-120N when interacting with them (and/or other devices). The sensitive data may include, for example, financial information, future plans, personal information, and/or other types of data that may be exploited by unintended recipients of the sensitive data. The unintended recipients may obtain the sensitive data by inadvertent transmission by the initiating devices or through intentional action by the unintended recipients to obtain the sensitive data. To reduce the likelihood of the sensitive data from being obtained by the unintended recipients, the initiating devices and the participating devices may perform one or more identity verification, authentication, communication security, and/or other actions (collectively the "protective actions") as part of or with the services provided by the initiating devices 110A-110N and participating devices 120A-120N.

The participating devices 120A-120N may be implemented using any number and types of computing devices known in the art, such as desktop or laptop computers, tablet devices, smartphones, or the like. The participating devices 120A-120N may provide computer implemented services to and/receive computer implemented services from the initiating devices 110A, 110N and/or other devices.

Like the initiating devices 110A-110N, the participating devices 120A-120N may be associated with corresponding users (e.g., administrators, customers, representatives, other persons, etc.) that use the participating devices 120A-120N to interact with one or more of the initiating devices 110A-110N (and/or other devices). The users and/or applications hosted by the participating devices may transmit and/or receive sensitive data to or from the initiating devices 110A-110N when interacting with them (and/or other devices). To reduce the likelihood of sensitive data being distributed to unintended recipient, the participating devices may perform one or more protective actions such as, for example, identity verification, authentication, communication security, and/or other actions as part of or with the services provided by the participating devices 120A-120N.

The initiating devices 110A-110N and the participating devices 120A-120N may cooperatively provide various computer implemented services to accomplish desirable goals for their respective users. For example, consider a scenario in which an initiating devices is being used by a banker to communicate with a banking client that is using a participating device. The banker may desire to send financial information to the banking client. Prior to doing so, the initiating device and/or participating device may perform one or more protective actions. For example, the initiating device may establish a secure communication channel (e.g., with encryption) to the participating device to reduce the likelihood of unintended recipients gaining access to the financial information.

To reduce the likelihood of unintended recipients from obtaining information transmitted between initiating devices and participating devices, embodiments disclosed herein may provide for the performance of protective actions using true random numbers. In contrast to many random numbers generated by computing devices which may not have a uniform distribution, true random numbers may have a uniform distribution.

For example, many computing devices rely on methods of generating random numbers that are not truly random. Rather, the underlying hardware of a computing device used to generate the random numbers may have a bias that results in a non-uniform distribution of numbers to be generated by the hardware. Unintended recipients may leverage a party's use of numbers that are not truly random to compromise various protective actions that may be performed using the not truly random numbers.

In an embodiment, initiating devices 110A, 110N and/or participating devices 120A, 120N do not include functionality to generate true random numbers. For example, some or all of these devices may not include hardware necessary to generate true random number. Rather than generating true random numbers, these devices may utilize a quantum random number service 112 to obtain true random numbers. These devices may use the true random numbers to perform one or more protective actions that are less likely to be subject to compromise by unintended recipients when compared to protective actions performed without true random numbers.

The quantum random number service 112 may be implemented using any number (one, many, etc.) and types of computing devices known in the art, such as desktop or laptop computers, tablet devices, smartphones, or the like.

The quantum random number service 112 may provide for the secure distribution of true random numbers to initiating devices 110A, 110N and participating devices 120A, 120N. To do so, the quantum random number service 112 may generate true random numbers, establish secure communication channels to initiating devices 110A, 110N and participating devices 120A, 120N, and provide the true random numbers to these devices using the secure communication channels. By doing so, any number of initiating devices 110A, 110N and participating devices 120A, 120N may perform one or more protective actions using true random numbers without needing to include functionality to generate the true random numbers. Rather, these devices may rely on the quantum random number service 112 for the true random numbers.

In an embodiment, quantum random number service 112 may distribute the same true random numbers to multiple initiating devices 110A, 110N and participating devices 120A, 120N. Consequently, these devices may sometimes rely on other devices having access to the same true random numbers. Accordingly, these devices may utilize the obtained true random numbers to, for example, obtain symmetric keys and/or authentication data.

In an embodiment, the quantum random number service 112 also distributes true random numbers to authentication service 114. Authentication service 114 may provide for third party authentication of initiating devices 110A, 110N and participating devices 120A, 120N. When doing so, authentication service 114 may use the true random numbers (and/or presume that similar numbers were distributed to initiating devices 110A, 110N and participating devices 120A, 120N) to authenticate these devices.

The authentication service 114 may be implemented using any number (one, many, etc.) and types of computing devices known in the art, such as desktop or laptop computers, tablet devices, smartphones, or the like.

To facilitate communications, any of the devices shown in FIG. 1 may be operably connected to each other with communications network 130. Communications network 130 may facilitate communications with one or more wired and/or wireless networks implemented using any suitable communications technology. In one embodiment, communications network 130 includes any number and type of transmission mediums (e.g., electrical cabling, optical cabling, free space channels, etc.) through which signals (e.g., electrical, optical, etc.) on which data is encoded are distributed amongst the devices. The communications network 130 may be implemented using any number and types of communication protocols.

Although FIG. 1 illustrates an environment and implementation in which various functionalities are performed by different devices, in some embodiments some or all of the functionalities of the initiating devices 110A-110N, participating devices 120A-120N, quantum random number service 112, and authentication service 114 are aggregated into a single device.

Example Implementing Apparatuses

Figure 2:
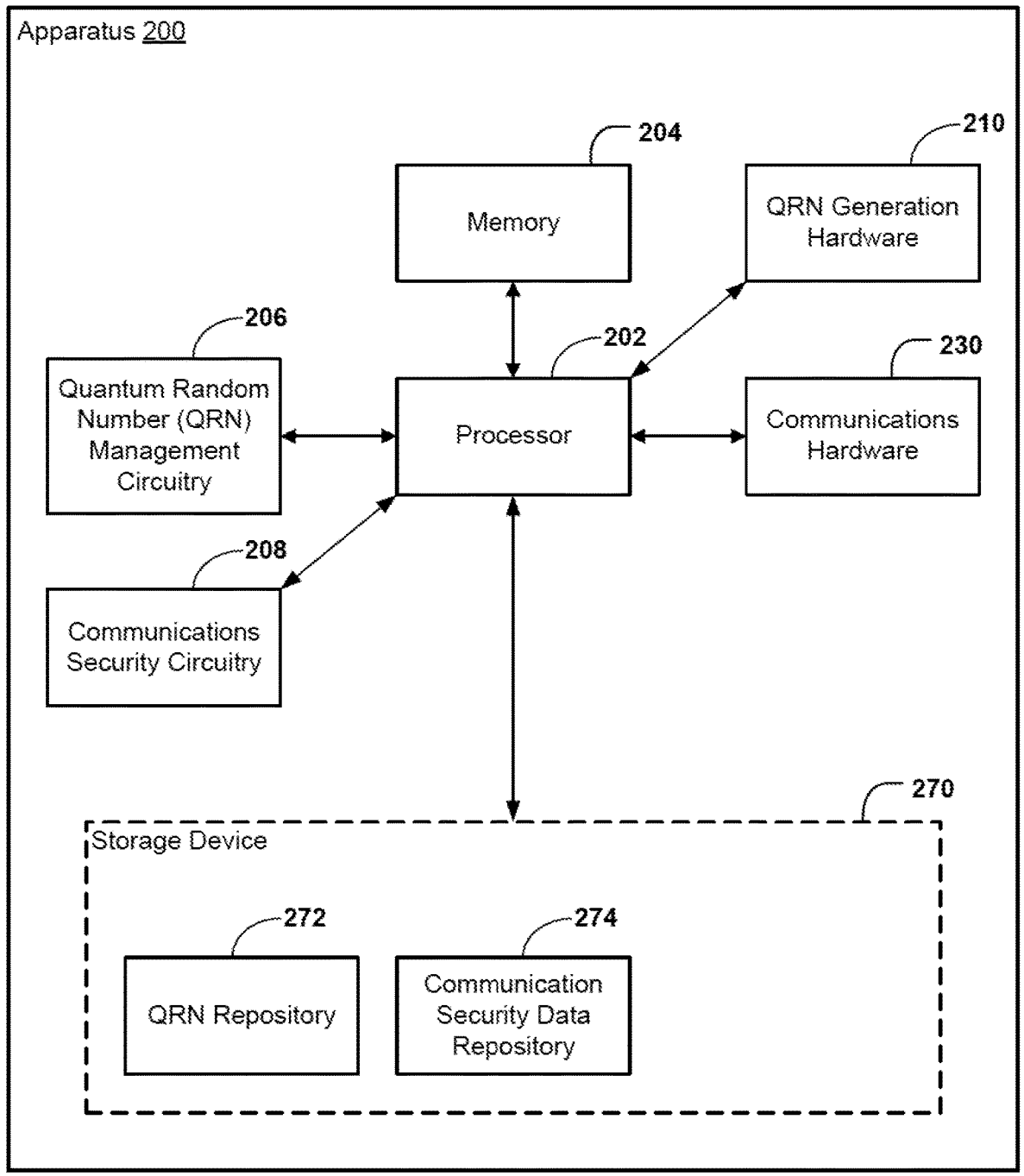
FIG. 2 illustrates a schematic block diagram of example circuitry embodying a device that may perform various operations in accordance with some example embodiments described herein.

Quantum random number service 112 may be embodied by one or more computing devices or servers, shown as apparatus 200 in FIG. 2. As illustrated in FIG. 2, the apparatus 200 may include processor 202, memory 204, quantum random number management circuitry 206, communications security circuitry 208, quantum random number generation hardware 210, communications hardware 230, and storage device 270, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection with FIGS. 5A-6D.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate or integrated storage device 270). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The quantum random number management circuitry 206 may be any means such as a device or circuitry embodied in either hardware or a combination of hardware and software that is configured to provide true random number management services which may include managing generation of true random numbers with quantum random number generation hardware 210, storage of true random numbers with quantum random number repository 272, distribution of true random numbers to other devices operably connected to apparatus 200, and/or otherwise facilitate the use of true random numbers in a distributed system.

The communications security circuitry 208 may be any means such as a device or circuitry embodied in either hardware or a combination of hardware and software that is configured to provide communications security services which may include authenticating other entities, establishing secure communications channels to other devices operably connected to apparatus 200, and/or performing other types of protective actions. The secure communications channels may be established for quantum random number management circuitry so that true random numbers may be distributed to other devices that may not include functionality to generate true random numbers. To secure the communication channels and/or for the performance of other protective actions, communications security circuitry 208 may derive symmetric keys, authentication data, and/or other types of data (collectively, "security data"). The security data may be stored in communication security data repository 274.

The quantum random number generation hardware 210 may be any means such as one or more devices or circuitry embodied in either hardware or a combination of hardware and software that is configured to generate true random numbers. The true random numbers may be generated by measuring one or more quantum processes. The quantum processes measure may be, for example, the electromagnetic field (e.g., amplitude and/or phase) in a vacuum over time. The electromagnetic field in a vacuum may exhibit changes in magnitude and phase over time due to the instantiation and destruction of virtual particles in the vacuum. Consequently, the measured magnitude and phase may correspond to a true random number distribution. The quantum random number generation hardware 210 may be implemented based on other types of quantum processes to generate true random numbers.

Once generated with the quantum random number generation hardware 210, the quantum random numbers may be stored in the quantum random number repository 272 for future use. The quantum random number management circuitry 206 may distribute true random numbers from the quantum random number repository 272 to other devices in accordance with a schema such that when the same true random number is distributed to multiple devices, each of the multiple devices may be to use the true random number for a protective action. For example, the schema may indicate when a particular true random number will be distributed, a relative ordering of distributed true random numbers, and/or other information usable by the devices to which the true random numbers are distributed to cooperatively use the true random numbers for protective action purposes (and/or other purposes).

The communications hardware 230 may be any means such as a device or circuitry embodied in either hardware or a combination of hardware and software that is configured to receive and/or transmit data from/to a network and/or any other device, circuitry, or module in communication with the apparatus 200. In this regard, the communications hardware 230 may include, for example, a network interface for enabling communications with a wired or wireless communication network. For example, the communications hardware 230 may include one or more network interface cards, data unit processors, antennas, buses, switches, routers, modems, and supporting hardware and/or software, or any other device suitable for enabling communications via a network. Furthermore, the communications hardware 230 may include the processing circuitry for causing transmission of such signals to a network or for handling receipt of signals received from a network.

Additionally, communications hardware 230 may include functionality to secure communications with, for example, encryption. The encryption may be applied at any layer of the network communication stack.

Finally, the apparatus 200 may include storage device 270 that stores data structures used by quantum random number management circuitry 206 and communications security circuitry 208 to provide their functionalities. Storage device 270 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

Quantum random number repository 272 may store any quantity of true random numbers generated by quantum random number generation hardware 210. Communication security data repository 274 may include any type and quantity of data usable to secure communication to other devices with communications hardware 230. For example, communication security data repository 274 may include encryption keys generated via any process. Any of the repositories 272, 274 may be implemented using any number and types of data structures (e.g., database, lists, tables, linked lists, etc.).

Although components 202-270 are described in part using functional language, it will be understood that the particular implementations necessarily include the use of particular hardware. It should also be understood that certain of these components 202-270 may include similar or common hardware. For example, the quantum random number management circuitry 206 and communications security circuitry 208 may each at times leverage use of the processor 202, memory 204, communications hardware 230, and/or storage device 270, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although quantum random number management circuitry 206 and communications security circuitry 208 may leverage processor 202 or memory 204 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 230 for enabling any functions not performed by special-purpose hardware elements. In all embodiments, however, it will be understood that the processor 202, memory 204, quantum random number generation hardware 210, communications hardware 230, and storage device 270 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. Thus, some or all of the functionality described herein may be provided by third party circuitry. For example, a given apparatus 200 may access one or more third party circuitries via any sort of networked connection that facilitates transmission of data and electronic information between the apparatus 200 and the third party circuitries. In turn, that apparatus 200 may be in remote communication with one or more of the other components describe above as comprising the apparatus 200.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Figure 3:
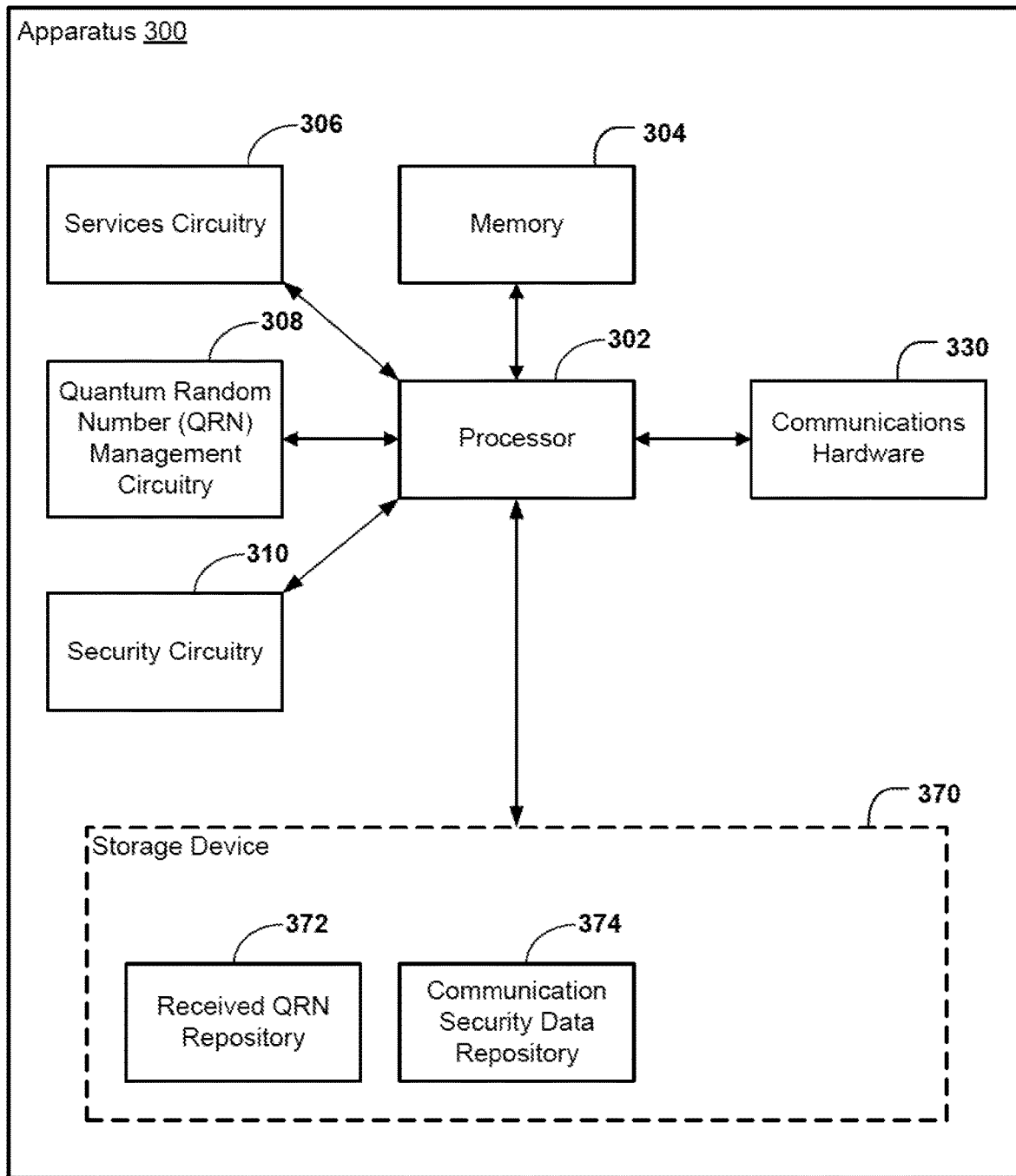
FIG. 3 illustrates a schematic block diagram of example circuitry embodying a device that may perform various operations in accordance with some example embodiments described herein.

Turning to FIG. 3, any of initiating devices 110A-110N may be embodied by one or more computing devices or servers, shown as apparatus 300 in FIG. 3. As illustrated in FIG. 3, the apparatus 300 may include processor 302, memory 304, services circuitry 306, quantum random number management circuitry 308, security circuitry 310, communications hardware 330, and storage device 370, each of which will be described in greater detail below. While the various components are only illustrated in FIG. 3 as being connected with processor 302, it will be understood that the apparatus 300 may further comprises a bus (not expressly shown in FIG. 3) for passing information amongst any combination of the various components of the apparatus 300. The apparatus 300 may be configured to execute various operations described above in connection with FIG. 1 and below in connection with FIGS. 5A-6D.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate or integrated storage device 370). In some cases, the processor may be configured to execute hard-coded functionality. As such, whether configured by hardware or software methods, or by a combination of hardware with software, the processor 302 represent an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The services circuitry 306 may be any means such as a device or circuitry embodied in either hardware or a combination of hardware and software that is configured to perform any number of services in isolation or in cooperation with other devices operably connected to apparatus 300. When providing the services, services circuitry 306 may cause sensitive data to be generated and/or transmitted to other devices with communications hardware 330. For example, the services circuitry 306 may provide electronic communications services (e.g., text based messaging, VOIP, etc.), database services, and/or other services which may involve the sending and/or receipt of sensitive data via communications hardware 330.

Prior to transmitting sensitive data, the services circuitry 306 may invoke the functionality of the security circuitry 310 to reduce the likelihood of sensitive data being distributed to unintended recipients.

The quantum random number management circuitry 308 may be any means such as a device or circuitry embodied in either hardware or a combination of hardware and software that is configured to provide true random number management services. True random number management services may include (i) establishing a secure communication channel to a quantum random number service, (ii) obtaining true random numbers from the quantum random number service via the secure communication channel, and (iii) storing the obtained true random numbers in received quantum random number repository 372 for future use. When storing the true random numbers, quantum random number management circuitry may index, mark, or otherwise categorize various true random numbers in received quantum random number repository 372 such that other devices that also received the true random numbers may cooperatively use the true random numbers. For example, the true random numbers in received quantum random number repository 372 may be time stamped.

In an embodiment, the true random numbers in received quantum random number repository 372 are generated by the quantum random number service based on a quantum process. Thus, the true random numbers in received quantum random number repository 372 may be referred to as quantum random numbers.

The security circuitry 310 may be any means such as a device or circuitry embodied in either hardware or a combination of hardware and software that is configured to provide communication security services. The communication security services may include authenticating another device participating in a service and/or establishing encryption keys for securing communications between apparatus 300 and the other device.

When providing it functionality, security circuitry 310 may use true random numbers from received quantum random number repository 372 to generate authentication data, keys (e.g., symmetric), and/or other types of information usable to (i) authenticate another device and/or (ii) encrypt communication to another device. Communication security data repository 374 may include any type and quantity of communication security data.

The communications hardware 330 may be any means such as a device or circuitry embodied in either hardware or a combination of hardware and software that is configured to receive and/or transmit data from/to a network and/or any other device, circuitry, or module in communication with the apparatus 300. In this regard, the communications hardware 330 may include, for example, a network interface for enabling communications with a wired or wireless communication network. For example, the communications hardware 330 may include one or more network interface cards, data unit processors, antennas, buses, switches, routers, modems, and supporting hardware and/or software, or any other device suitable for enabling communications via a network. Furthermore, the communications hardware 330 may include the processing circuitry for causing transmission of such signals to a network or for handling receipt of signals received from a network.

In an embodiment, communications hardware 330 includes functionality to use keys from communication security data repository 374 to encrypt data prior to transmission. For example, communications hardware 330 may use a key to provide for encryption at any layer of a network stack implemented by the communications hardware 330.

Finally, the apparatus 300 may include storage device 370 that stores data structures used by services circuitry 306, quantum random number management circuitry 308, and/or security circuitry 310 to provide their functionalities. Storage device 370 may be a non-transitory storage and include any number and types of physical storage devices (e.g., hard disk drives, tape drives, solid state storage devices, etc.) and/or control circuitry (e.g., disk controllers usable to operate the physical storage devices and/or provide storage functionality such as redundancy, deduplication, etc.).

As noted above, received quantum random number repository 372 may store any quantity of true random numbers obtained from a quantum random number service, along with any number of associations, categorizations, etc. to facilitate cooperative use of true random numbers distributed to multiple devices. Communication security data repository 374 may include any type and quantity of data usable to secure communication with communications hardware 330 and/or authenticate other devices. For example, communication security data repository 374 may include symmetric encryption keys generated using some of the true random numbers stored in quantum random number repository 372. Any of the repositories 372, 374 may be implemented using any number and types of data structures (e.g., database, lists, tables, linked lists, etc.).

While illustrated in FIG. 3 as being a part of apparatus 300, the storage device 370 may be a part of a different device operably connected to apparatus 300.

Although components 302-370 are described in part using functional language, it will be understood that the particular implementations necessarily include the use of particular hardware. It should also be understood that certain of these components 302-370 may include similar or common hardware. For example, the services circuitry 306, quantum random number management circuitry 308, and security circuitry 310 may each at times leverage use of the processor 302, memory 304, communications hardware 330, and/or storage device 370, such that duplicate hardware is not required to facilitate operation of these physical elements of the apparatus 300 (although dedicated hardware elements may be used for any of these components in some embodiments, such as those in which enhanced parallelism may be desired). Use of the terms "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 300 to perform the various functions described herein.

Although services circuitry 306, quantum random number management circuitry 308, and security circuitry 310 may leverage processor 302 or memory 304 as described above, it will be understood that any of these elements of apparatus 300 may include one or more dedicated processor, specially configured field programmable gate array (FPGA), or application specific interface circuit (ASIC) to perform its corresponding functions, and may accordingly leverage processor 302 executing software stored in a memory (e.g., memory 304), or memory 304, or communications hardware 330 for enabling any functions not performed by special-purpose hardware elements. In all embodiments, however, it will be understood that the processor 302, memory 304, communications hardware 330, and storage device 370 are implemented via particular machinery designed for performing the functions described herein in connection with such elements of apparatus 300.

In some embodiments, various components of the apparatus 300 may be hosted remotely (e.g., by one or more cloud servers) and thus need not physically reside on the corresponding apparatus 300. Thus, some or all of the functionality described herein may be provided by third party circuitry. For example, a given apparatus 300 may access one or more third party circuitries via any sort of networked connection that facilitates transmission of data and electronic information between the apparatus 300 and the third party circuitries. In turn, that apparatus 300 may be in remote communication with one or more of the other components describe above as comprising the apparatus 300.

As will be appreciated based on this disclosure, example embodiments contemplated herein may be implemented by an apparatus 300. Furthermore, some example embodiments may take the form of a computer program product comprising software instructions stored on at least one non-transitory computer-readable storage medium (e.g., memory 304). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 300 as described in FIG. 3, that loading the software instructions onto a computing device or apparatus produces a special-purpose machine comprising the means for implementing various functions described herein.

Figure 4:
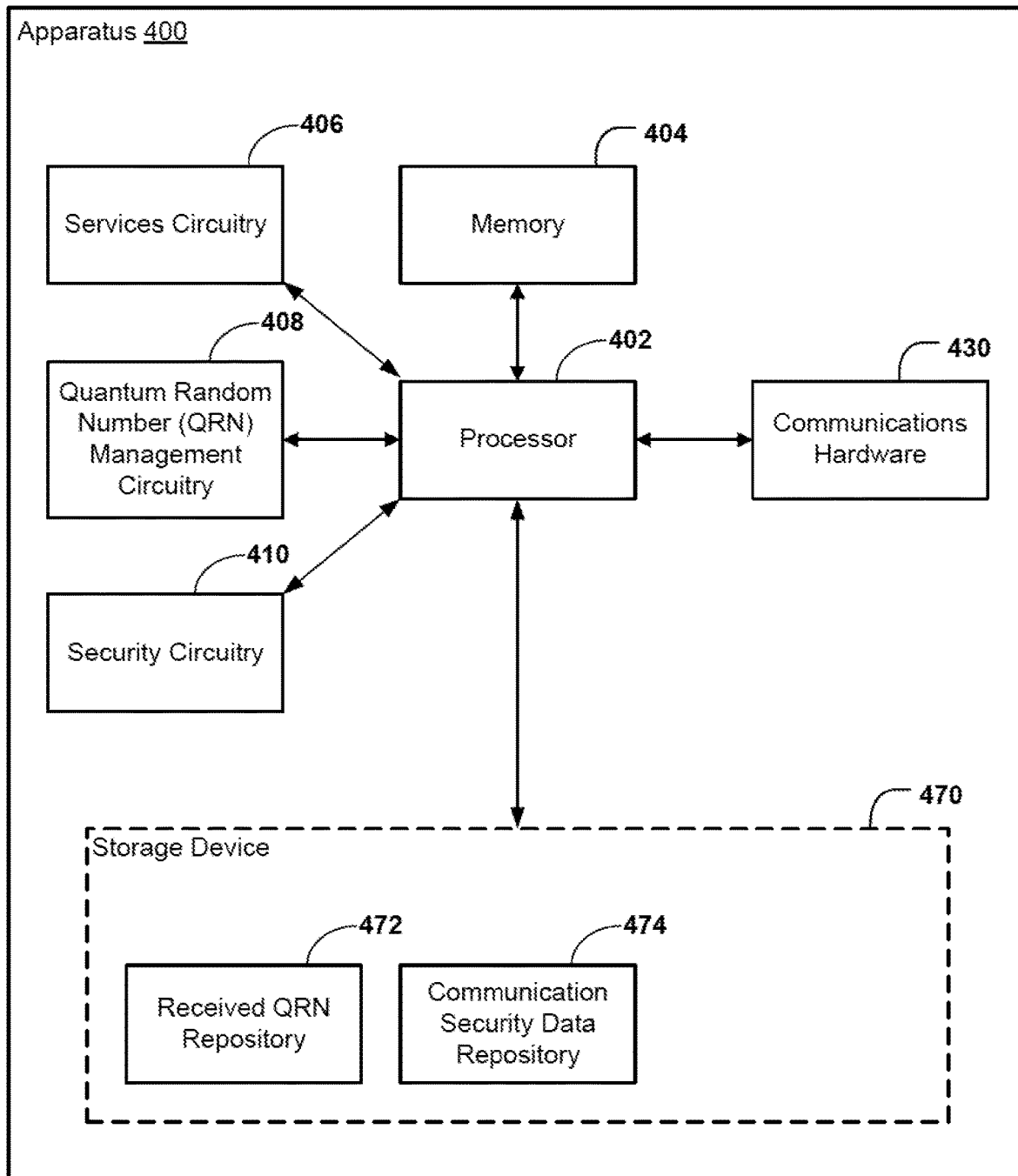
FIG. 4 illustrates a schematic block diagram of example circuitry embodying a device that may perform various operations in accordance with some example embodiments described herein.

Returning to the discussion of FIG. 1, any of participating devices 120A-120N may be embodied by one or more computing devices or servers, shown as apparatus 400 in FIG. 4. As illustrated in FIG. 4, the apparatus 400 may include processor 402, memory 404, services circuitry 406, quantum random number management circuitry 408, security circuitry 410, communications hardware 430, and storage device 470 (including received QRN repository 472 and communication security data repository 474), each of which may be similar to similarly named components described with respect to FIG. 3. Generally, the components of apparatus 400 may provide similar functions to those similarly named and described with respect to FIG. 3.

As will be appreciated based on this disclosure, example embodiments contemplated herein may be implemented by an apparatus 400. Furthermore, some example embodiments may take the form of a computer program product comprising software instructions stored on at least one non-transitory computer-readable storage medium (e.g., memory 404). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 400 as described in FIGS. 4A-3C, that loading the software instructions onto a computing device or apparatus produces a special-purpose machine comprising the means for implementing various functions described herein.

Having described specific components of example apparatuses 200, 300, and 400, example embodiments are described below.

Example Apparatus Operations for Communication Security

Figure 5A:
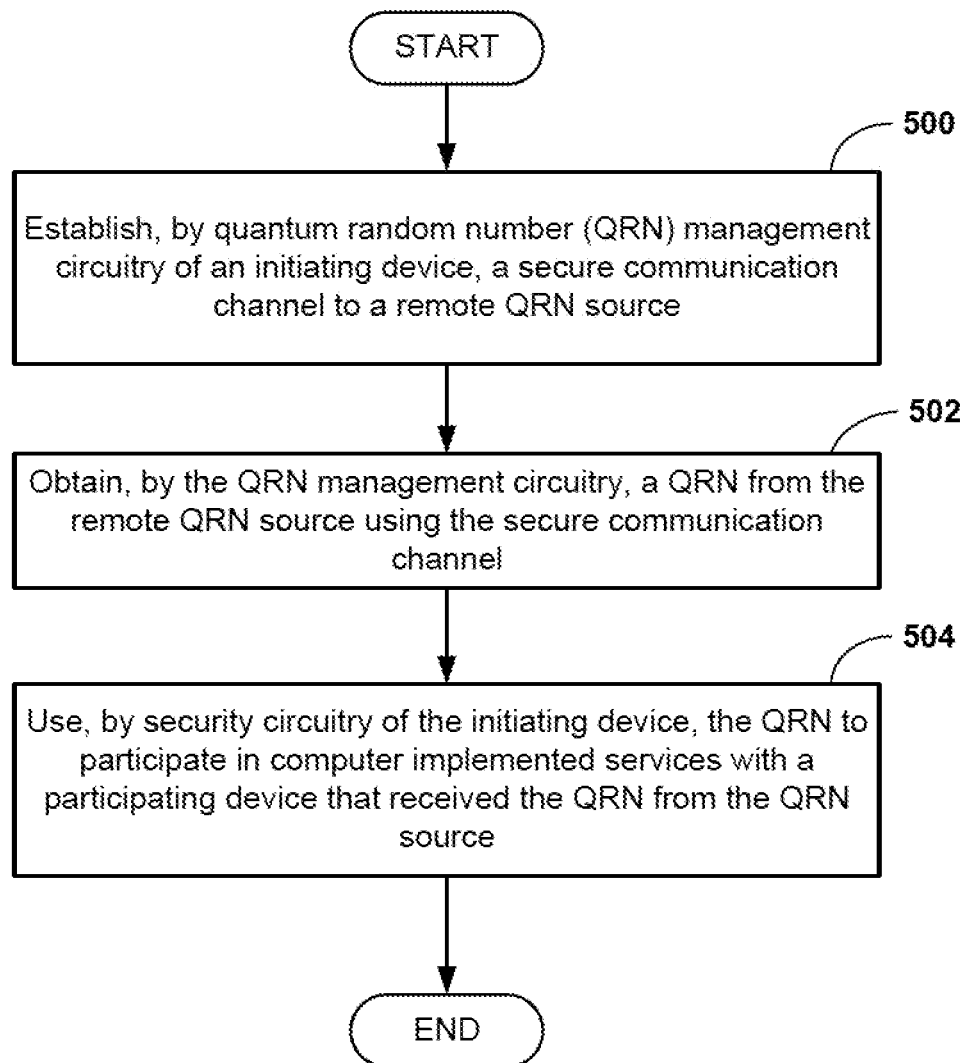
FIG. 5A illustrates an example flowchart for providing computer implemented services using a quantum random number, in accordance with some example embodiments described herein.

Turning to FIGS. 5A-5D, example flowcharts are illustrated that contain example operations implemented by various embodiments described herein. FIGS. 5A-6 illustrate example operations for securing communications between devices.

The operations illustrated in FIGS. 5A-5D may, for example, be performed by initiating devices shown in FIG. 1, which may in turn be embodied by an apparatus 300, which is shown and described in connection with FIG. 3. To perform the operations described below, the apparatus 300 may utilize one or more of processor 302, memory 304, services circuitry 306, quantum random number management circuitry 308, security circuitry 310, communications hardware 330, storage device 370, and/or any combination thereof.

Turning first to FIG. 5A, example operations are shown for participating in computer implemented services. For example, an initiating device may be performing services that may cause it to distribute sensitive data to a participating device. To reduce the likelihood of the sensitive data being distributed to or intercepted by an unintended recipient, the initiating device may utilize true random numbers (e.g., quantum random numbers) to manage the risk associated with sending sensitive data as part of the computer implemented services.

As shown by operation 500, the apparatus 300 includes means, such as processor 302, memory 304, quantum random number management circuitry 308, security circuitry 310, and communications hardware 330, or the like, for establishing a secure communication channel to a quantum random number sources. The quantum random number sources may be remote to apparatus 300 but may be operably connected via a network or other communication medium.

To establish the secure communication channel to the remote quantum random number source, any protocol for establishing a secure communication channel may be used. For example, a transport layer security (TLS) protocol may be performed to establish the secure communication channel. In another example, an internet protocol security protocol (IPsec) may be performed to establish the secure communication channel.

In an embodiment, data stored in a repository may be used to establish the secure communication channel. For example, the repository (e.g., of the initiating device such as communication security data repository) may include pre-shared keys, one time passwords, and/or other types of data structured usable to establish a secure communication channel with the remote quantum random number source. These data structures may be stored in the repository, for example, at a factory, at a time when the quantum random number source and the initiating device are likely to be securely connected to one another (e.g., while both are connected via a trusted, private network), or at other points in time.

In an embodiment, the secure communication channel is established without use of information derived from quantum phenomena. For example, a pre-shared key used to secure the communication channel may not be based on quantum phenomena or other phenomena usable to obtain true random numbers.

As shown by operation 502 the apparatus 300 includes means, such as processor 302, memory 304, quantum random number management circuitry 308, security circuitry 310, and communications hardware 330, or the like, for obtaining a quantum random number from the remote quantum random number source using the secure communication channel. The quantum random number may be obtained by, for example, sending a request for the quantum random number to the quantum random number source, by receiving a quantum random number that is automatically distributed by the quantum random number service, or via other methods. The quantum random number source may also distribute the quantum random number to a participating device. In some embodiments, the quantum random number service may be the exclusive source of true random numbers for the initiative device and the participating device.

The obtain quantum random number may be stored in a repository for future use, along with, for example, timestamp data, ordering data, and/or other information such that the initiating device and participating device may cooperatively use the distributed quantum random number. For example, when performing a subsequent protective action with a quantum random number, both devices participating in the protective action may use a similar, previously distributed quantum random number.

As shown by operation 504, the apparatus 300 includes means, such as processor 302, memory 304, services circuitry 306, quantum random number management circuitry 308, security circuitry 310, and communications hardware 330, or the like, for using the quantum random number to participate in computer implemented services with the participating device that received the quantum random number from the quantum random number sources. The quantum random number may be used, for example, to authenticate the participating device (and/or a user thereof), to secure communications with the participating device, and/or to otherwise reduce the likelihood that sensitive data may be obtained by an unintended recipient when it is transmitted as part of the computer implemented services.

For example, consider a scenario in which the initiating device provides database services to the participating device. As part of the database services, the initiating device may obtain financial information (or other sensitive information) from the database and provide it to the participating device. To reduce the likelihood of the financial information from being obtained by an unintended recipient, the initiating device may authenticate the participating device by generating authentication data and using the authentication data to ascertain whether the participating device is authorized to have access to the financial information. Refer to FIG. and the corresponding description, below, for additional details regarding authenticating a participating device.

In another example, consider a scenario where the initiating device is connected to the participating device via an insecure network. In such a scenario, the initiating device may use the quantum random number to generate, for example, an encryption key. The encryption key may be used to encrypt data passed between the initiating device and the participating device via the insecure network. Refer to FIG. 5C and the corresponding description, below, for additional details regarding securing communications between initiating and participating devices.

Figure 5B:
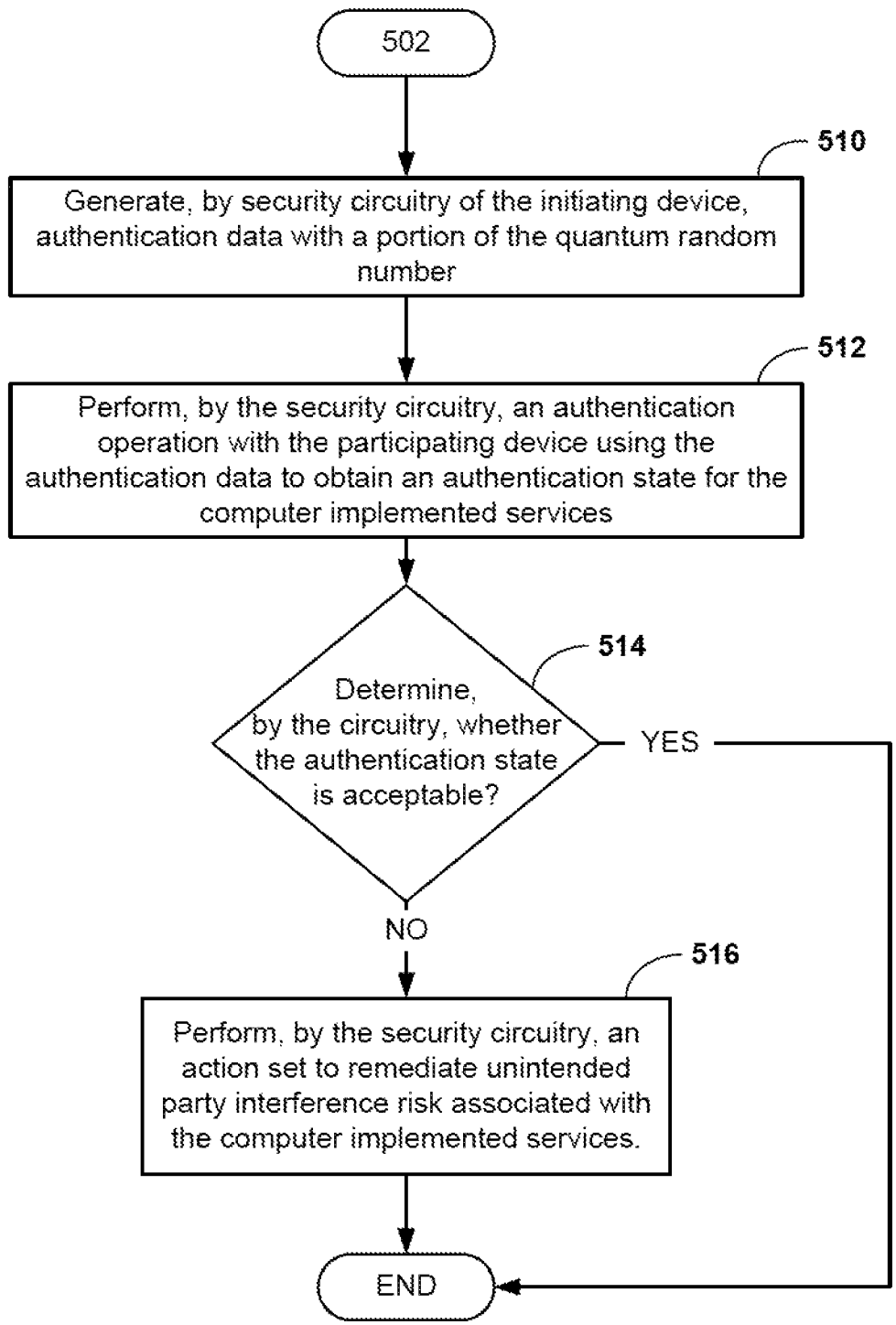
FIG. 5B illustrates an example flowchart for performing an authentication operation, in accordance with some example embodiments described herein.
Figure 5C:
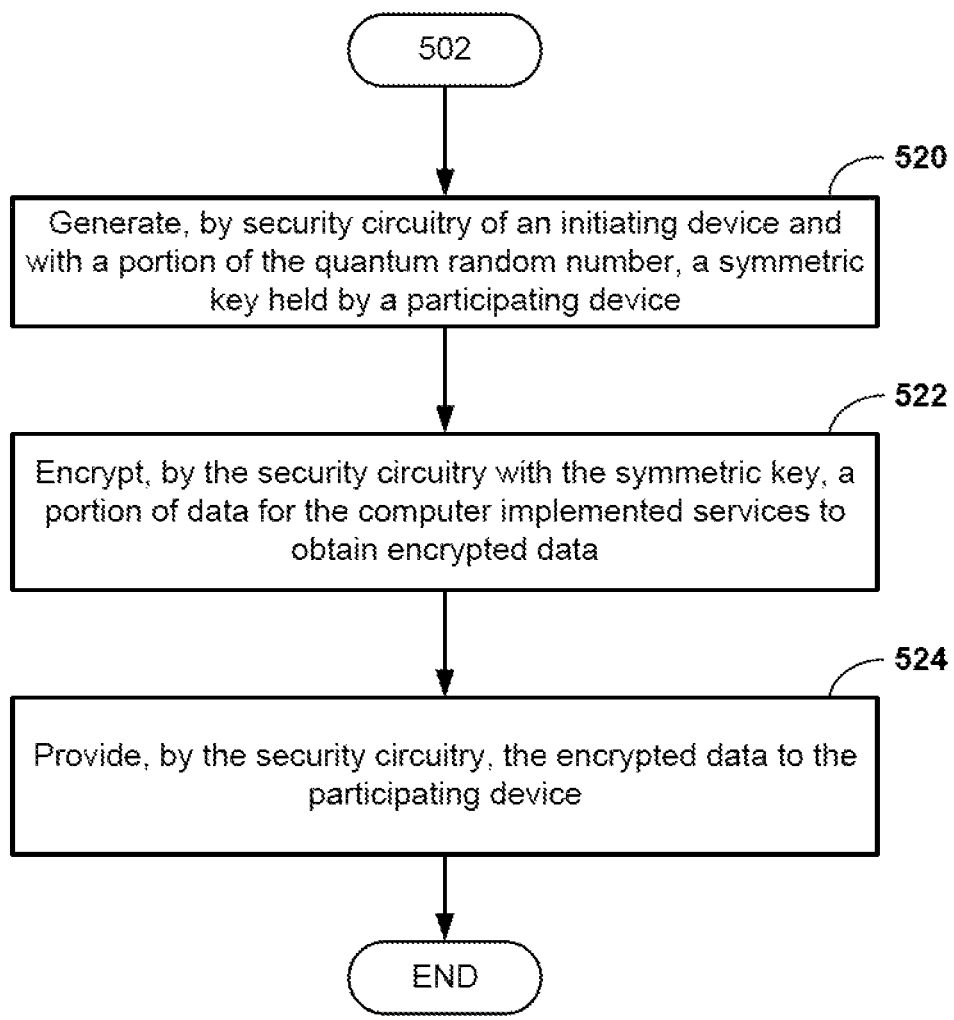
FIG. 5C illustrates an example flowchart for encrypting data, in accordance with some example embodiments described herein.

Turning first to FIG. 5B, example operations are shown for authenticating a participating device. For example, an initiating device may authenticate a participating device prior to providing the participating device with sensitive information. To reduce the likelihood of the sensitive data being distributed to or intercepted by an unintended recipient, the initiating device may utilize true random numbers (e.g., quantum random numbers) to manage the risk associated with sending sensitive data as part of the computer implemented services.

As shown by operation 510, the apparatus 300 includes means, such as processor 302, memory 304, services circuitry 306, quantum random number management circuitry 308, security circuitry 310, and communications hardware 330, or the like, for generating authentication data with a portion of the quantum random number (e.g., obtain in operation 502). The authentication may include any type and quantity of data based on the quantum random number. By virtue of the method by which the quantum random number is generated, the authentication data may be based on a true random number.

In one embodiment, the authentication data includes a bit sequence derived from the quantum random number. The bit sequence may be derived using any method or process.

As shown by operation 512, the apparatus 300 includes means, such as processor 302, memory 304, services circuitry 306, quantum random number management circuitry 308, security circuitry 310, and communications hardware 330, or the like, for performing an authentication operation with the participating device using the authentication data to obtain an authentication state for the computer implemented services.

In an embodiment, the authentication is performed by receiving second authentication data from the participating device, comparing the authentication data to the second authentication data, and determining the authentication state based on the comparison. For example, if the second authentication data matches the authentication, then the authentication state may be acceptable. Otherwise the authentication state may not be acceptable. In an embodiment, an authentication performed in this fashion is a unilateral authentication where one of the initiating device or the participating device determines an authentication state of the other device without require mutual activity of both devices.

The comparison performed above may allow the initiating device to ascertain whether the participating device also received the quantum random number. The participating device may generate (or may be challenged to provide) the second authentication data using the quantum random number thereby allowing the initiating device to ascertain whether the participating device also has access to the quantum random number without requiring either of the devices to disclose the quantum random number.

In an embodiment, the authentication is a third party authentication. The third party authentication may be performed with authentication service 114. For example, a request for authentication of the participating device may be sent to authentication service 114. The authentication service may then perform an authentication of the participating device using a quantum random number distributed by the quantum random number service to the participating device and the authentication service. The authentication service may then notify or otherwise information the initiating device of the authentication state of the participating device.

In an embodiment, the authentication is a mutual authentication where both the initiating device and the participating device generate and exchange respective authentication data. Both device may then determine authentication states for the other device.

As shown by operation 514, the apparatus 300 includes means, such as processor 302, memory 304, services circuitry 306, quantum random number management circuitry 308, security circuitry 310, and communications hardware 330, or the like, for determining whether the authenticate state is acceptable. In other words, the authentication state obtained in operation 512 may be checked to see if it is acceptable. An acceptable authentication state may indicate that the initiating device believes that the participating device has access to the quantum random number. An unacceptable authentication state, however, may indicate that the initiating device believes that there may be unintended party interference risk associated with the computer implemented services.

If it is determined that the authentication state is not acceptable, then the method may proceed to operation 516 following operation 514.

As shown by operation 516, the apparatus 300 includes means, such as processor 302, memory 304, services circuitry 306, quantum random number management circuitry 308, security circuitry 310, and communications hardware 330, or the like, for performing an action set to remediate unintended party interference risk associated with the computer implemented services. The action set may include one or more of the following actions: (i) performing an additional authentication of the participating device with another quantum random number, (ii) terminating the computer implemented services, (iii) restricting some of the computer implemented services to prevent transmission of sensitive data while allowing other computer implemented services to continue, and/or (iv) performing a third party authentication of the participating device.

Turning first to FIG. 5C, example operations are shown for securing communications between an initiating device and a participating device. For example, an initiating device may send sensitive data to a participating device as part of one or more computer implemented services. To reduce the likelihood of the sensitive data being distributed to or intercepted by an unintended recipient, the initiating device may utilize true random numbers (e.g., quantum random numbers) to secure communications between these devices.

As shown by operation 520, the apparatus 300 includes means, such as processor 302, memory 304, services circuitry 306, quantum random number management circuitry 308, security circuitry 310, and communications hardware 330, or the like, for generating a symmetric key held by a participating device. The symmetric key may be generated with a key generation function that operates on a portion of the quantum random number.

As shown by operation 522, the apparatus 300 includes means, such as processor 302, memory 304, services circuitry 306, quantum random number management circuitry 308, security circuitry 310, and communications hardware 330, or the like, for encrypting a portion of data for the computer implemented services to obtain encrypted data. The portion of the data may be encrypted with the symmetric key.

As shown by operation 524, the apparatus 300 includes means, such as processor 302, memory 304, services circuitry 306, quantum random number management circuitry 308, security circuitry 310, and communications hardware 330, or the like, for providing the encrypted data to the participating device. The encrypted data may be provided to the participating device by sending it to the participating device via one or more networks. For example, in an internet protocol network, the encrypted data may be packetized and the packets may be sent to the participating device. The participating device may obtain the packets and reconstruct the encrypted data from the packets.

The participating device may also have access to the symmetric key, as noted above, thereby allowing the participating device to decrypt the encrypted data. In contrast, unintended recipients may not have access to the symmetric key thereby preventing them from obtaining decrypting the encrypted data even if the unintended recipients have access to the packets.

Figure 5D:
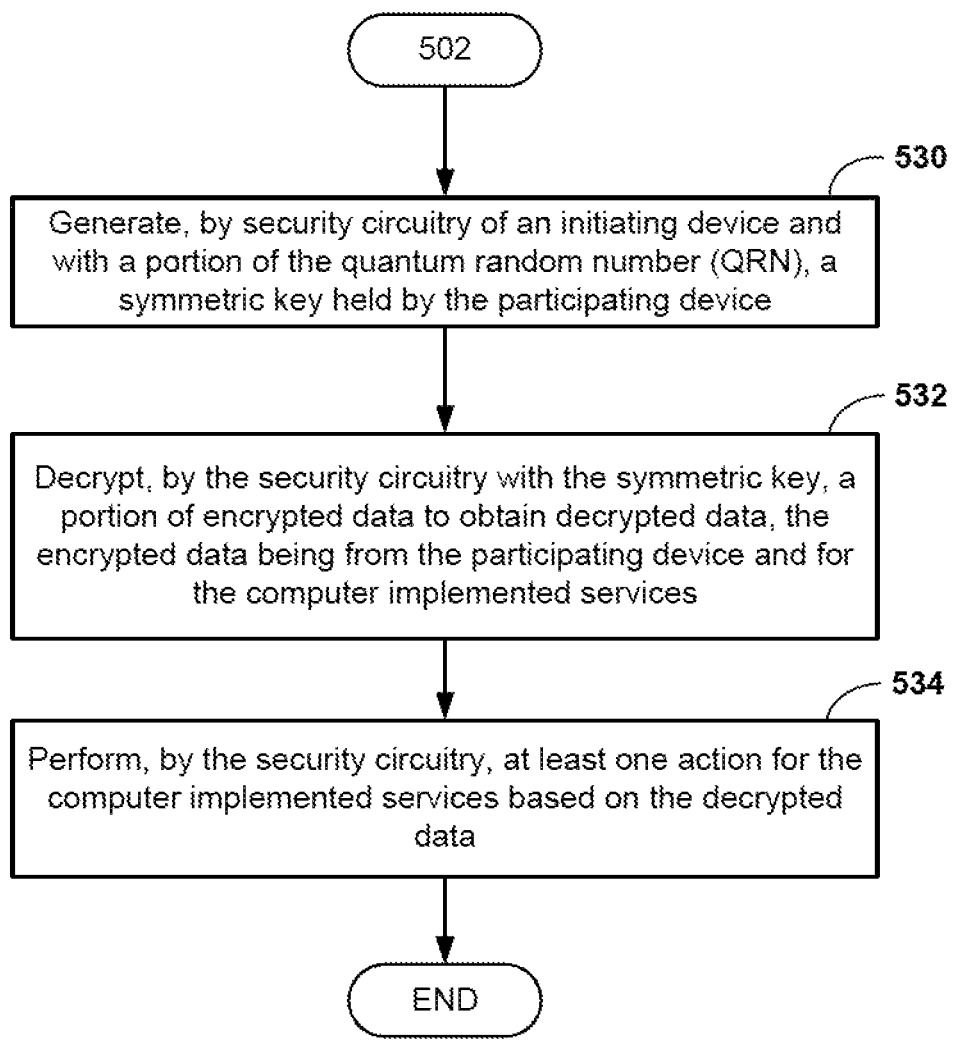
FIG. 5D illustrates an example flowchart for decrypting data, in accordance with some example embodiments described herein.

Turning first to FIG. 5D, example operations are shown for securing communications between an initiating device and a participating device. For example, an initiating device may send sensitive data to a participating device as part of one or more computer implemented services. Likewise, the participating device may send additional sensitive data to the initiating device in response to receiving the sensitive data. To reduce the likelihood of the additional sensitive data being distributed to or intercepted by an unintended recipient, the initiating device may utilize true random numbers (e.g., quantum random numbers) to secure communications between these devices.

As shown by operation 530, the apparatus 300 includes means, such as processor 302, memory 304, services circuitry 306, quantum random number management circuitry 308, security circuitry 310, and communications hardware 330, or the like, for generating a symmetric key held by a participating device. The symmetric key may be generated with a key generation function that operates on a portion of the quantum random number.

As shown by operation 532, the apparatus 300 includes means, such as processor 302, memory 304, services circuitry 306, quantum random number management circuitry 308, security circuitry 310, and communications hardware 330, or the like, for decrypting a portion of encrypted data to obtain decrypted data. The encrypted data may be from the participating device and may be for the computer implemented services. For example, the encrypted data may include sensitive data from the participating device.

As shown by operation 534, the apparatus 300 includes means, such as processor 302, memory 304, services circuitry 306, quantum random number management circuitry 308, security circuitry 310, and communications hardware 330, or the like, for performing at least one action for the computer implemented services based on the decrypted data. The at least one action may include, for example, storing the decrypted portion of encrypted data, identifying and providing additional data to the participating device, sending out one or more notifications regarding the decrypted portion of the encrypted data, etc.

FIGS. 5A-5D illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

Example System Operations

As noted above, initiating devices and participating devices may utilize true random numbers from a quantum random number service to reduce the likelihood of unintended recipients accessing sensitive data or otherwise utilizing computer implemented services provided by these devices. FIGS. 6A-6D show diagrams illustrating example operations performed by components of a distributed system that may be performed during their operation. In these figures, operations performed by a quantum random number service are shown along the line extending from the box labeled "quantum random number service", operations performed by an initiating device are shown along the line extending from the box labeled "initiating device", operations performed by a participating device are shown along the line extending from the box labeled "participating device", and operations performed by an authentication service are shown along the line extending from the box labeled "authentication service". Operations impacting multiple devices, such as data transmissions between the devices, are shown using arrows extending between these lines. Generally, the operations are ordered temporally with respect to one another. However, it will be appreciated that the operations may be performed in other orders from those illustrated herein.

Turning first to FIG. 6A, at operation 600, a quantum random number service (e.g., with QRN generation hardware 210, processor 202, memory 204, etc.) generates a quantum random number. The quantum random number may be generated based on a quantum process that provides for true random numbers to be obtained. Thus, the quantum random number may correspond to a true random number.

After generation, at operations 602, 604, and 606, the quantum random number service distributes (e.g., with communications hardware 230 in cooperation with QRN management circuitry 206, processor 202, memory 204, etc.) the quantum random number to an initiating device, a participating device, and/or an authentication service. The quantum random number may be distributed using secure connections (e.g., secured with communication security circuitry 208) between the quantum random number service and these other devices. The secure connections may be secured using classical mechanisms such as, for example, the through the use of one time passwords, public key generation, and/or via other methods.

The operation 602-606 may be performed, for example, in accordance with a plan for distributing quantum random number, in response to a request for a quantum random number from one of these devices, or in other manners. By distributing the quantum random number to these devices, each of these devices may use the quantum random number to perform subsequent processes such as authentication and/or securing of communications.

Turning first to FIG. 6B, at operation 610, the initiating device beings to perform an authentication of itself to the participating device by generating authentication data (e.g., with security circuitry 310, processor 302, memory 304, etc.) with the quantum random number. The authentication data may be generated with a function or other method of generating authentication data using the quantum random number as input.

At operation 612, the authentication data is provided (e.g., with communications hardware 330, processor 302, memory 304, etc.) to the participating device. For example, the authentication data may be packetized and transmitted to the participating device which may reassemble the authentication data from the packets.

At operation 614, the participating device performs (e.g., with security circuitry 410, processor 402, memory 404, etc.) an authentication check of the authentication with the quantum random number. For example, the participating device may generate (e.g., with security circuitry 410, processor 402, memory 404, etc.) similar authentication data with the quantum random number, compare the generated authentication data to that which it obtained from the initiating device, and determine, based on the comparison, whether the initiating device is authenticated (e.g., an acceptable authentication state).

If the initiating device is authenticated, then the participating device (e.g., with security circuitry 410, processor 402, memory 404, communications hardware 430, etc.) may begin to provide sensitive data to the initiating device. Otherwise, the participating device may treat the initiating device as being suspect and not provide it with sensitive data.

Figure 6C:
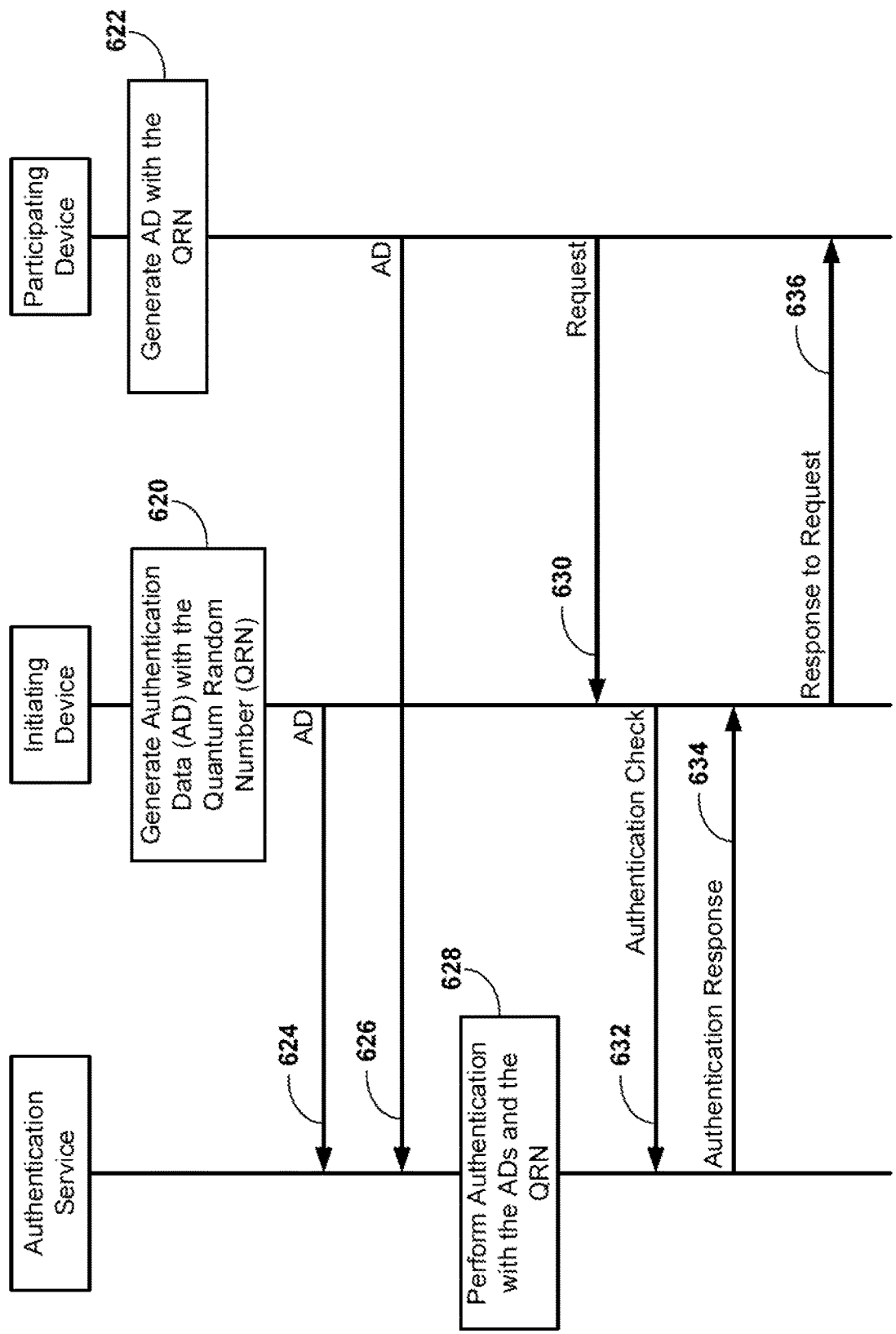

Turning to FIG. 6C, in some scenarios, the initiating device and participating device may wish to perform a third party authentication using the authentication service. To do so, at operations 620 ad 622, both the initiating device (e.g., with security circuitry 310, processor 302, memory 304, communications hardware 330, etc.) and participating device (e.g., with security circuitry 410, processor 402, memory 404, communications hardware 430, etc.) may generate authentication data using a quantum random number (e.g., from storage devices 370, 470). Each device may use the same or different quantum random numbers that were previously distributed to the respective device (e.g., from a quantum random number service).

At operations 624 and 626, the initiating device (e.g., with security circuitry 310, processor 302, memory 304, communications hardware 330, etc.) and participating device (e.g., with security circuitry 410, processor 402, memory 404, communications hardware 430, etc.) provide the authentication data to the authentication service. Because the quantum random numbers were also distributed to the authentication service, at operation 628, the authentication is able to perform an authentication with the authentication data. At this point, the authentication service may be aware of the authentication states of the initiating device and participating device.

Consequently, at operation 630, when the participating device (e.g., with services circuitry 406, processor 402, memory 404, communications hardware 430, etc.) requests sensitive data from initiating device, the initiating device, at operation 632, requests (e.g., with security circuitry 310, processor 302, memory 304, communications hardware 330, etc.) an authentication check of the participating device from the initiating device.

To service the authentication check request, at operation 634, the authentication service generates and sends an authentication response to the initiating device. The authentication response may indicate whether the participating device has been authenticated by the authentication service.

Based on the authentication response, at operation 636, the initiating device (e.g., with security circuitry 310, processor 302, memory 304, communications hardware 330, etc.) sends a response to the request to the participating device. If the authentication response indicates that the participating device has been authenticated, then the response to the request may include the sensitive data requested (and, in turn, facilitate completion of any subsequent computer implemented services). In contrast, if the authentication response indicates that the participating device has not been authenticated, then the response to the request may indicate that the sensitive data will not be provided (thereby limiting completion of any subsequent computer implemented services).

Figure 6D:
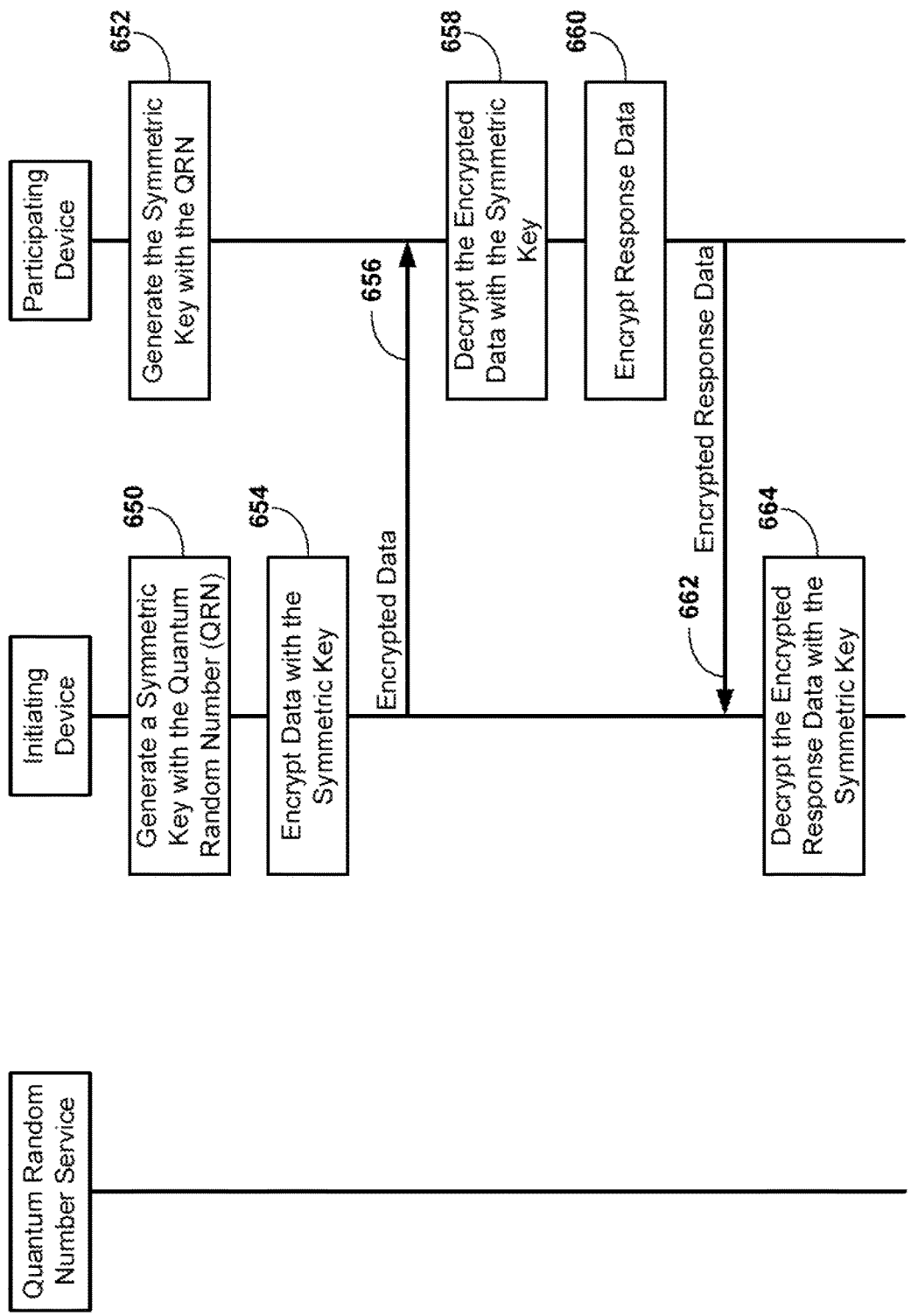

Turning to FIG. 6D, in some scenarios, the initiating device and participating device may also secure communications (in addition to and/or alternatively to performing authentications) that may include sensitive data by encrypting them. To do so, at operations 650 and 652, both the initiating device (e.g., with security circuitry 310, processor 302, memory 304, communications hardware 330, etc.) and the participating device (e.g., with security circuitry 410, processor 402, memory 404, communications hardware 430, etc.) may generate a symmetric key using the quantum random number (e.g., previously obtained from a quantum random number service).

At operation 654, the initiating device (e.g., with security circuitry 310, processor 302, memory 304, communications hardware 330, etc.) may encrypt data with the symmetric key. The encrypted data may be encrypted, for example, as part of a transport layer security protocol (or another protocol such as IPsec) implemented using the symmetric key. The data may be encrypted with the symmetric key via other methods without departing from embodiments disclosed herein.

At operation 656, the encrypted data (e.g., with security circuitry 310, processor 302, memory 304, communications hardware 330, etc.) is provided to the participating device. Because the participating device also has access to the symmetric key, at operation 658, the participating device (e.g., with security circuitry 410, processor 402, memory 404, communications hardware 430, etc.) is able to decrypt the encrypted data.

The decrypted data may, at operation 660, prompt the participating device to encrypt (e.g., with security circuitry 410, processor 402, memory 404, communications hardware 430, etc.) response data with the symmetric key (or other keys obtained with the symmetric key) and, at operation

662, provide (e.g., with security circuitry 410, processor 402, memory 404, communications hardware 430, etc.) the encrypted response data to the initiating device.

Using the symmetric key, at operation 664, the initiating device (e.g., with security circuitry 310, processor 302, memory 304, communications hardware 330, etc.) may decrypt the encrypted response data.

In some embodiments, some of the operations described above in connection with FIGS. 5A-6D may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for securing communications between an initiating device and a participating device using quantum random numbers, the method comprising:
    establishing, by quantum random number (QRN) management circuitry of the initiating device, a first secure communication channel between the initiating device and a remote quantum random number (QRN) source;
    obtaining, by the QRN management circuitry of the initiating device, a quantum random number (QRN) from the remote QRN source using the first secure communication channel between the initiating device and the remote QRN source, the QRN being a true random number; and
    using, by security circuitry of the initiating device, the QRN to participate in computer implemented services with the participating device that received the QRN from the remote QRN source over a second secure communication channel established between the remote QRN source and the participating device wherein information based on the QRN is also received by an authentication service.

2. The method of claim 1, wherein using the QRN to participate in the computer implemented services comprises:
    generating, by the security circuitry with a portion of the QRN, authentication data;
    performing, by the security circuitry with the authentication data, an authentication operation with the participating device to obtain an authentication state for the computer implemented services;
    determining, by the security circuitry, whether the authentication state is acceptable or unacceptable;
    in an instance in which the authentication state is determined to be unacceptable, performing an action set to remediate unintended party interference risk associated with the computer implemented services; and
    in an instance in which the authentication state is acceptable, performing the computer implemented services without performing any action sets to remediate the unintended party interference risk.

3. The method of claim 2,
    wherein the authentication operation is a unilateral authentication of the initiating device to the participating device or the participating device to the initiating device,
    wherein, in an instance in which the authentication operation is the unilateral authentication of the initiating device to the participating device, performing the authentication operation comprises providing, by the security circuitry, information based on the authentication data to the participating device, and
    wherein, in an instance in which the authentication operation is the unilateral authentication of the participating device to the initiating device, performing the authentication operation comprises:
        obtaining, by the security circuitry, information from the participating device, and
        obtaining, by the security circuitry, the authentication state with the information from the participating device and the authentication data.

4. The method of claim 2, wherein the authentication operation is a mutual authentication of the initiating device and the participating device.

5. The method of claim 4, wherein the mutual authentication comprises:
    providing, by the security circuitry, the authentication data to the authentication service to authenticate the initiating device to a remote security service;
    obtaining, by the security circuitry, a request from the participating device for data from the initiating device as part of the computer implemented services;
    providing, by the security circuitry, an authentication request for the participating device to the remote security service in response to the request from the participating device;
    receiving, by the security circuitry, an authentication response for the participating device from the remote security service as a response to the authentication request; and
    sending, by the security circuitry, a response to the request from the participating device,
    wherein, in an instance in which the authentication response indicates that the participating device is authenticated, then the response facilitates completion of the computer implemented services, and
    wherein, in an instance in which the authentication response indicates that the participating device is not authenticated, then the response limits completion of the computer implemented services.

6. The method of claim 1, wherein using the QRN to participate in the computer implemented services comprises:
    generating, by the security circuitry with a portion of the QRN, a symmetric key;
    encrypting, by the security circuitry with the symmetric key, a portion of data for the computer implemented services to obtain encrypted data; and providing, by the security circuitry, the encrypted data to the participating device.

7. The method of claim 1, wherein using the QRN to participate in the computer implemented services comprises:
generating, by the security circuitry with a portion of the QRN, a symmetric key;
obtaining, by the security circuitry, encrypted data from the participating devices and being for the computer implemented services;
decrypting, by the security circuitry with the symmetric key, a portion of the encrypted data to obtain decrypted data; and
performing, by the security circuitry, at least one action for the computer implemented services based on the decrypted data.

8. The method of claim 1, wherein the initiating device does not include functionality to generate true random numbers.

9. An initiating device, comprising:
quantum random number (QRN) management circuitry configured to:
establish a first secure communication channel between the initiating device and a remote quantum random number (QRN) source, and
obtain a quantum random number (QRN) from the remote QRN source using the first secure communication channel between the initiating device and the remote QRN source, the QRN being a true random number; and
security circuitry configured to use the QRN to participate in computer implemented services with a participating device that received the QRN from the remote QRN source over a second secure communication channel established between the remote QRN source and the participating device, wherein information based on the QRN is also received by an authentication service.

10. The initiating device of claim 9, wherein using the QRN to participate in the computer implemented services comprises:
generating, by the security circuitry with a portion of the QRN, authentication data;
performing, by the security circuitry with the authentication data, an authentication operation with the participating device to obtain an authentication state for the computer implemented services;
determining, by the security circuitry, whether the authentication state is acceptable or unacceptable;
in an instance in which the authentication state is determined to be unacceptable, performing an action set to remediate unintended party interference risk associated with the computer implemented services; and
in an instance in which the authentication state is acceptable, performing the computer implemented services without performing any action sets to remediate the unintended party interference risk.

11. The initiating device of claim 10,
wherein the authentication operation is a unilateral authentication of the initiating device to the participating device or the participating device to the initiating device,
wherein, in an instance in which the authentication operation is the unilateral authentication of the initiating device to the participating device, performing the authentication operation comprises providing, by the security circuitry, information based on the authentication data to the participating device, and
wherein, in an instance in which the authentication operation is the unilateral authentication of the participating device to the initiating device, performing the authentication operation comprises:
obtaining, by the security circuitry, information from the participating device, and
obtaining, by the security circuitry, the authentication state with the information from the participating device and the authentication data.

12. The initiating device of claim 10, wherein the authentication operation is a mutual authentication of the initiating device and the participating device.

13. The initiating device of claim 10, wherein the initiating device does not include functionality to generate true random numbers.

14. A quantum random number service device, comprising:
quantum random number (QRN) generation hardware configured to generate true random numbers with a quantum process;
QRN management circuitry configured to:
establish a first secure communication channel to an initiating device and a second secure communication channel to a participating device, and
distribute information based on the true random number to (i) an authentication service, (ii) the initiating device using the first secure communication channel and (iii) the participating device using the second secure communication channel, the information being usable to secure communications between the initiating device and the participating device; and
communications hardware configured to secure distribution of the information to the initiating device and the participating device.

15. The quantum random number service device of claim 14, wherein distributing the information based on the true random number to both the initiating device and the participating device comprises:
generating the information using one or more of the true random numbers, the information comprising a bit sequence usable by the initiating device to generate authentication data, the authentication data being usable to identify an authentication state of the participating device,
providing, with the communications hardware and via the first secure communication channel, data that comprises the information to the initiating device; and
providing, with the communications hardware and via the second secure communication channel, other data to the participating device.

16. The quantum random number service device of claim 15, wherein the data and the other data are identical.

17. The quantum random number service device of claim 14, wherein the quantum random number service is an exclusive source of any true random numbers used to secure communications between the initiating device and the participating device.

18. The quantum random number service device of claim 14, wherein the QRN management circuitry distributes the information based on the true random number to the initiating device and the participating device in response to a request from at least one of the initiating device and the participating device.

19. The quantum random number service device of claim 14, wherein the QRN management circuitry is configured to distribute the information to the authentication service over a third secure communication channel.

\* \* \* \* \*